United States Patent
Meeker et al.

(10) Patent No.: US 6,851,759 B2
(45) Date of Patent: Feb. 8, 2005

(54) RETAINING A BRAKE ROTOR IN AN VEHICLE CORNER APPARATUS

(75) Inventors: Steven E. Meeker, Norwalk, OH (US); Richard A. Scheufler, Jr., Collins, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/230,622

(22) Filed: Aug. 29, 2002

(65) Prior Publication Data

US 2004/0041461 A1 Mar. 4, 2004

(51) Int. Cl.⁷ .............................. B60B 27/00
(52) U.S. Cl. ................... 301/105.1; 29/894.36
(58) Field of Search .............. 301/6.1, 6.8, 105.1; 188/218 A, 218 XL; 29/894.36, 894.362; 72/325, 327, 335

(56) References Cited

U.S. PATENT DOCUMENTS

| | | | | |
|---|---|---|---|---|
| 4,699,433 A | * | 10/1987 | Kopp | 301/6.6 |
| 4,792,020 A | * | 12/1988 | Okumura et al. | 188/18 A |
| 4,917,440 A | * | 4/1990 | Daudi | 301/35.621 |
| 4,986,605 A | * | 1/1991 | Descombes | 301/105.1 |
| 5,725,285 A | * | 3/1998 | Niebling et al. | 301/105.1 |
| 5,816,093 A | * | 10/1998 | Takeuchi et al. | 72/327 |
| 5,943,897 A | * | 8/1999 | Tsue et al. | 72/335 |
| 6,176,266 B1 | * | 1/2001 | Huber et al. | 137/800 |
| 6,309,110 B1 | * | 10/2001 | Tajima et al. | 384/544 |
| 6,408,669 B1 | | 6/2002 | Meeker et al. | |
| 6,485,187 B1 | | 11/2002 | Meeker et al. | |
| 6,574,865 B2 | | 6/2003 | Meeker et al. | |
| 6,575,535 B2 | * | 6/2003 | Meeker et al. | 301/35.621 |
| 6,622,377 B1 | | 9/2003 | Johnson et al. | |

OTHER PUBLICATIONS

U.S. Appl. No. 09/713,681, filed Nov. 15, 2000, Meeker, et al.

* cited by examiner

*Primary Examiner*—Russell D. Stormer
(74) *Attorney, Agent, or Firm*—Michael D. Smith

(57) ABSTRACT

A vehicle corner apparatus and method of fabricating a vehicle corner apparatus, utilize a wheel spindle adapted for receiving a self-tapping screw for securing a brake rotor to the wheel spindle. Using a self-tapping screw allows manufacturing and assembly costs to be significantly reduced, in comparison to prior vehicle corners that used a machine screw and a threaded hole in a wheel spindle for securing a rotor to the spindle, and provides greater assurance that the lateral run out of the brake rotor will be maintained at a lower value than can be achieved in prior vehicle corners. The wheel spindle includes a retaining screw hole having a conical web adapted to receive and facilitate installation and increase holding force of the self-tapping screw. The retaining screw hole may also include a counter bore for receipt of a locator pin that is used during subsequent formation of wheel bolt holes in the spindle. The rotor retention screw hole for the self-tapping screw, with or without the counter bore, may be formed by a simple sequence of operations using a pair of coining punches.

8 Claims, 3 Drawing Sheets

RETAINING A BRAKE ROTOR IN AN VEHICLE CORNER APPARATUS

TECHNICAL FIELD OF THE INVENTION

This invention relates a vehicle corner apparatus, and more particularly to a method and apparatus for retaining a brake rotor in a vehicle corner apparatus.

BACKGROUND OF THE INVENTION

It is common practice in building vehicles such as cars and trucks to fabricate components and sub-assemblies of major components in locations remote from the site of final assembly of the component or sub-assembly into the vehicle. The remotely fabricated components and sub-assemblies are stored until needed, and shipped to the site of final assembly into the vehicle, as they are needed.

One such sub-assembly, known as a "corner" apparatus of a vehicle, typically includes a wheel spindle, and a disk brake rotor attached to the wheel spindle. The corner may also include a number of other components, such as an axle and wheel bearing, a speed sensing apparatus, a disk brake caliper apparatus, and a steering knuckle.

It is important that the brake rotor be secured tightly to the wheel spindle, in a predetermined position relative to the wheel spindle, until the corner is assembled into the vehicle, and a wheel is bolted to the wheel spindle, in order to preclude debris from getting between the faying (i.e. mating) surfaces of the rotor and the wheel spindle. Any debris between the faying surfaces will cause lateral run-out of the brake rotor with respect to the wheel spindle that contributes significantly to generating undesirable pulsations of the brakes and vehicle forward motion, during braking.

Prior wheel spindles have included a threaded hole for receiving a rotor retaining machine screw that passes through the brake rotor for securing the brake rotor to the wheel spindle in the corner apparatus. Providing the threaded hole requires that sequential drilling and tapping steps be performed during fabrication of the wheel spindle. It is also necessary that extra care and time be taken to ensure that the machine screw properly engages the threads in the threaded hole, when attaching the rotor to the spindle, so that the screw is not cross threaded or the threads damaged. It would be advantageous to eliminate the extra time and cost required for providing the threaded hole and carefully inserting the machine screw into the hole.

In prior wheel spindles the threaded hole is typically located with respect to wheel bolt holes in the spindle, for wheel bolts used to secure a wheel to the corner. The wheel bolt holes are in turn typically located in a pattern with respect to a plurality of alignment holes in the spindle. It would be advantageous to eliminate the need for the alignment holes in the spindle.

SUMMARY OF THE INVENTION

Our invention provides an improved vehicle corner apparatus and method of fabricating a vehicle corner apparatus, through the use of a wheel spindle adapted for receiving a self-tapping screw for securing a brake rotor to the wheel spindle. Using a self-tapping screw allows manufacturing and assembly costs to be significantly reduced, in comparison to prior vehicle corners that used a machine screw and a threaded hole in a wheel spindle for securing a rotor to the spindle.

In some forms of our invention, the wheel spindle includes a retaining screw hole having a conical web adapted to receive and facilitate installation and increase holding force of the self-tapping screw. The retaining screw hole may also include a counter bore for receipt of a locator pin that is used during formation of wheel bolt holes in the spindle, to thereby eliminate the need for the plurality of alignment holes used for positioning the wheel bolt holes and a threaded rotor retention screw hole in prior vehicle corner assemblies.

In a preferred embodiment of our invention, the rotor retention screw hole for the self-tapping screw, with or without the counter bore, is formed by a simple sequence of operations using a pair of coining punches.

Our invention may also take the form of a method for forming a wheel spindle or a vehicle corner apparatus according to our invention.

The foregoing and other features and advantages of our invention are apparent from the following detailed description of exemplary embodiments, read in conjunction with the accompanying drawing. The detailed description and drawing are merely illustrative of the invention rather than limiting, the scope of the invention being defined by the appended claims and equivalents thereof.

DETAILED DESCRIPTION

Figure 1:
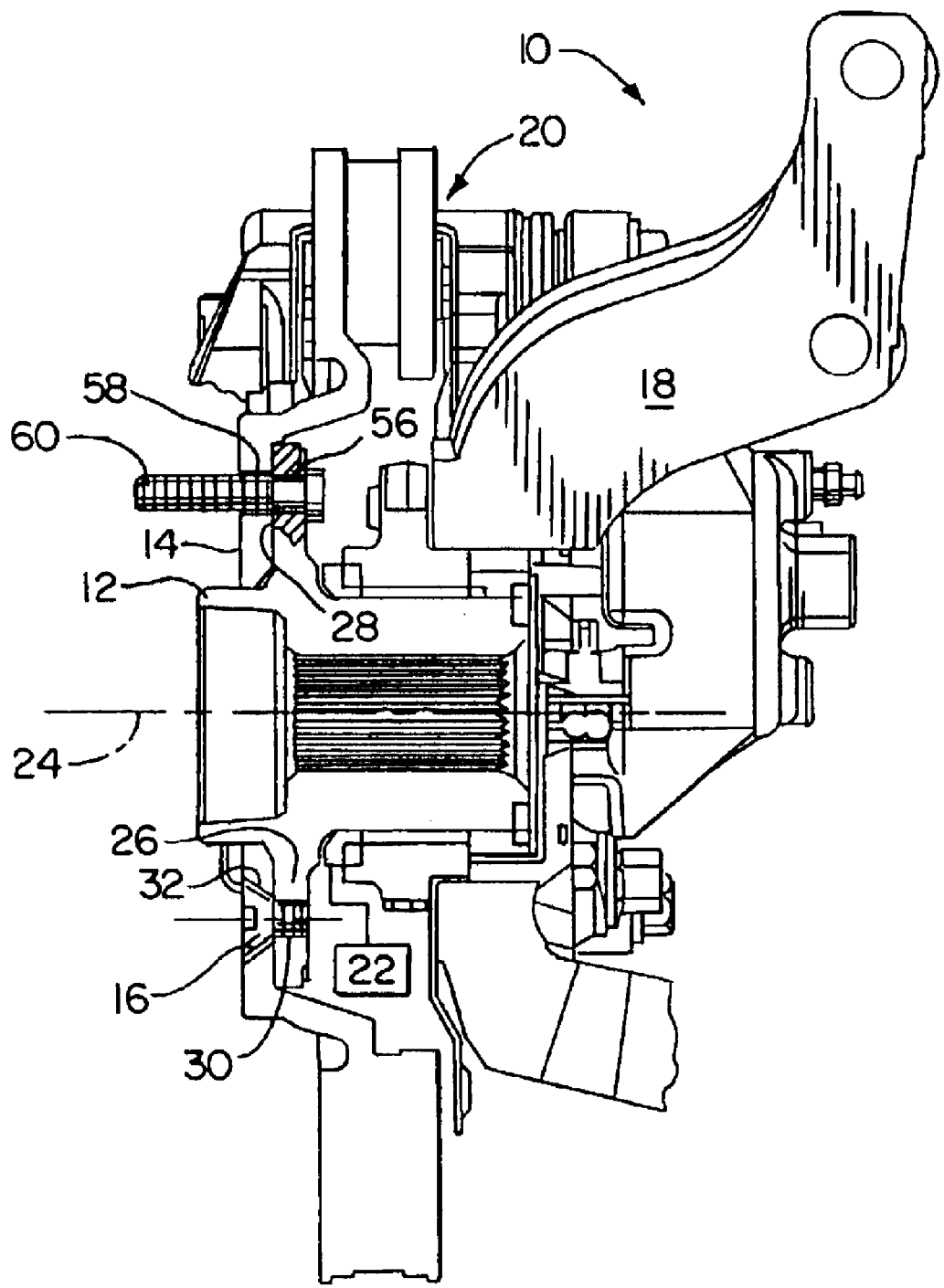
FIG. 1 shows a vehicle corner apparatus, according to our invention.

FIG. 1 shows an exemplary embodiment of a corner apparatus 10, according to our invention, for a vehicle. The corner apparatus 10 includes a wheel spindle 12, and a brake rotor 14 attached to the spindle 12 by a self-tapping rotor retaining screw 16. The corner 10 also includes an axle and wheel bearing inside the spindle, a knuckle 18, a brake caliper apparatus 20, and a speed sensing apparatus 22 for use in a controlled braking system. The brake caliper apparatus 20 may take a number of forms, including a hydraulic or pneumatic actuated caliper, an electrically actuated caliper, or a hybrid caliper.

The wheel spindle 12 defines an axis 24 of the spindle 12, and includes an annular flange 26 extending perpendicularly to the axis 24. The annular flange 26 has a rotor receiving surface 28 thereof, adapted for receiving the brake rotor 14, and includes a rotor retention screw hole 30 in the flange 26, adapted for receiving the self-tapping screw 16 for retaining the brake rotor 14 against the rotor receiving surface 28 of the annular flange 26.

The brake rotor 14 includes a hole 32 therein for receipt and passage therethrough of the self-taping screw 16. The hole 32 in the rotor includes a countersink to receive the head of the self-tapping screw 16, so that the head of the screw 16 lies below a wheel-receiving surface 34 of the rotor 14. The self-tapping screw 16 passes through the hole 32 in the rotor 14, and engages the rotor retention screw hole 30 in the wheel spindle 12, to thereby retain the rotor 14 against the rotor receiving surface 28 of the annular flange 26 of the wheel spindle 12.

Figure 2:
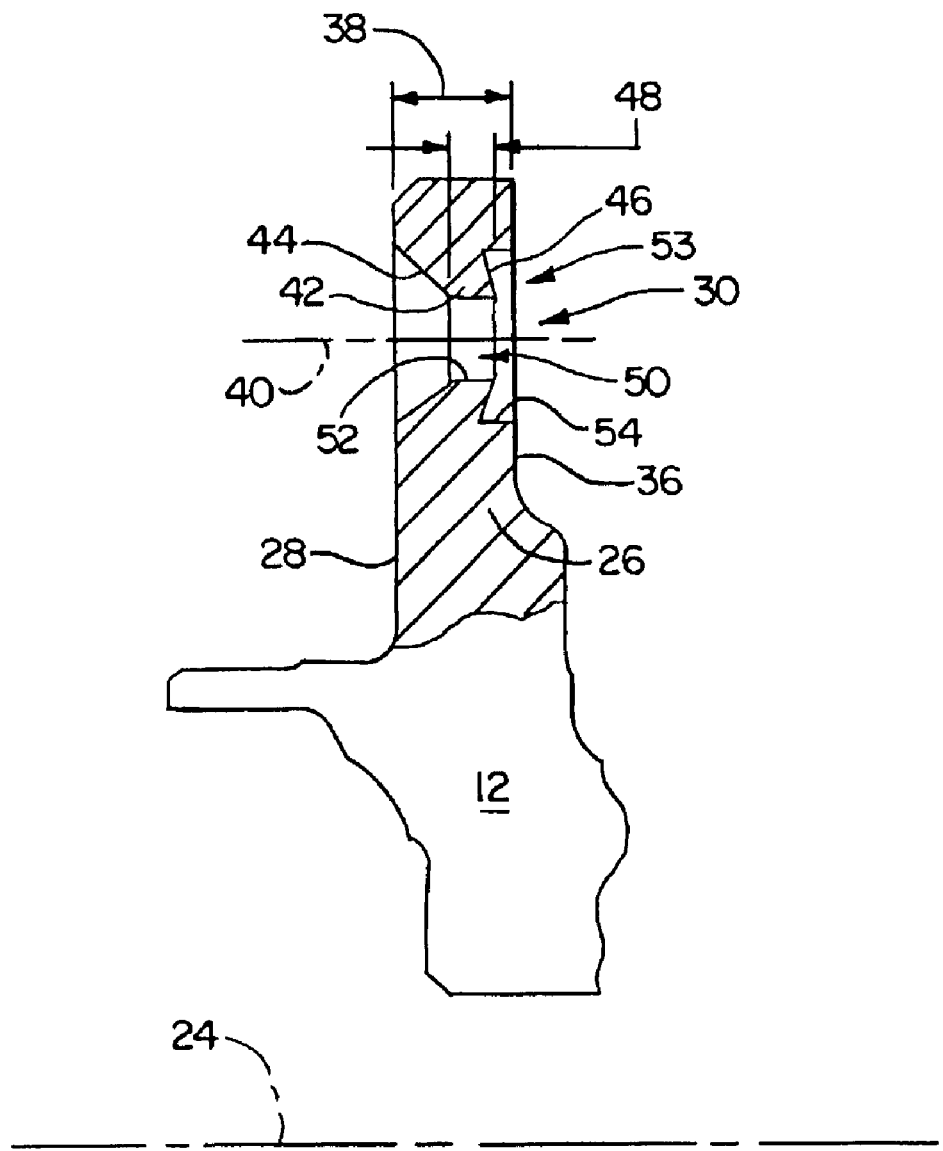
FIG. 2 is a partial cross section of a wheel spindle, according to our invention, of the vehicle corner apparatus of FIG. 1.

As shown in FIG. 2, the annular flange 26 of the wheel spindle 12 includes a second surface 36 thereof, separated from the rotor receiving surface 28 by a thickness 38 of the flange 26. The rotor retention screw hole 30 extends through the thickness 38 of the flange 26, and defines a screw hole axis 40 extending parallel to the axis 24 of the spindle 12.

The rotor retention screw hole 30 includes web 42 for engaging the self-tapping screw 16. In the exemplary embodiment depicted in FIG. 2, the web 42 is generally conical, and has a first surface 44 thereof converging along the axis 40 of the screw hole 30 in a direction away from the rotor receiving surface 28, and a second surface 46 thereof separated from the first surface 44 thereof by a thickness 48 of the conical web 42. The first and second surfaces 44, 46 of the conical web 42 are generally smooth and conical shaped, but walls that are curved, or having multiple conical or faceted segments, or having other configurations are also contemplated A portion of the screw hole 30 defines a through-hole 50, extending along the screw hole axis 40 from the first to the second surfaces 44, 46 of the conical web 42. The through-hole 50 has a diameter and side wall 52 adapted to allow the self-tapping screw 16 to engage the conical web 42.

Those having skill in the art will recognize that the configuration and orientation of the conical web 42 within the retaining screw hole 30 provides a structure that functions in a manner similar to a Bellville washer, to preload an axial strain into the self-tapping screw 16 as the screw 16 is tightened. This preload ensures that the screw 16 will not loosen, or be as readily subject to fatigue failure as the machine screws used in prior corner assemblies having threaded retaining screw holes. The conical web 42 holds the screw 16 so securely in a properly torqued condition, in fact, that no other locking feature is required.

As shown in FIG. 2, the intersection of the wall 52 of the through hole 50 and the first surface 44 of the conical web 42 may be rounded to provide stress relief and facilitate guiding the self-tapping screw 16 into engagement with the through-hole 50. The alignment and engagement of the self-tapping screw 16 with the through hole 50 may be further facilitated by tapering the wall 52 of the through-hole outward slightly, at an angle of about 5 degrees from cylindrical, for example, such that the end of the through hole 50 closest to the rotor retaining surface 28 is slightly larger in diameter than the remainder of the through-hole 50.

The conical web 42 may be recessed slightly from the rotor receiving surface 28 of the annular flange 26, and/or the intersection of the first surface 44 of the conical web 42 with the rotor receiving surface 28 may be rounded, to provide stress relief and facilitate guiding the self-tapping screw 16 into engagement with the through-hole 50.

As shown in FIG. 2, the conical web 42 is recessed from both the rotor receiving surface 28 and the second surface 36 of the annular flange 26. In various embodiments of our invention, it may be desirable to recess the conical web 42 from either or both of the rotor receiving surface 28 and the second surface 36.

In the exemplary embodiment, the conical web 42 is recessed from the second surface 36 of the annular flange 26, a distance sufficient to form a counter bore 53. The counter bore 53 has a diameter significantly larger that the through hole 50, and a generally cylindrical sidewall 54 centered about the screw hole axis 40. The second surface 46 of the conical web 42 forms a bottom surface of the counter bore 53, sloping slightly into the annular flange 26 adjacent the wall 54 of the counter bore 53, in a direction toward the rotor receiving surface 28. In addition to helping define the second surface 46 of the conical web 42, the counter bore 53 can be used during subsequent manufacturing operations for indexing the spindle 12 about the spindle axis 24 to properly orient a pattern of wheel bolt holes 56 in the flange 26 with respect to the rotor retention screw hole 30, so that the wheel bolt holes 56 and the retention screw hole 30 will align with corresponding wheel bolt and retaining screw holes 58, 32 in the brake rotor 14, to thereby allow passage of the wheel bolts 60 and retaining screw 16 through the rotor 14.

While it is possible to form the spindle 12 described above, and in particular the hole 30 for the self-tapping screw 16, by many manufacturing methods including drilling and boring, we contemplate that a method as described below, with reference to FIGS. 3–6, according to our invention, may be preferred.

FIGS. 3–6 represent sequentially performed operations for retaining a rotor 14 on a wheel spindle 12, in a corner apparatus 10 as described above, in relation to the exemplary embodiment shown in FIGS. 1 and 2. The method includes fabricating a wheel spindle 12, defining an axis 24 of the spindle 12, and including an annular flange 26 extending perpendicularly to the axis 24. The annular flange 26 is fabricated to include a rotor receiving surface 26 thereof adapted for receiving a brake rotor 14, and having a rotor retention screw hole 30 in the flange 26 adapted for receiving a self-tapping screw 16 for retaining the brake rotor 14 against the rotor receiving surface 28 of the annular flange 26.

Figure 3:
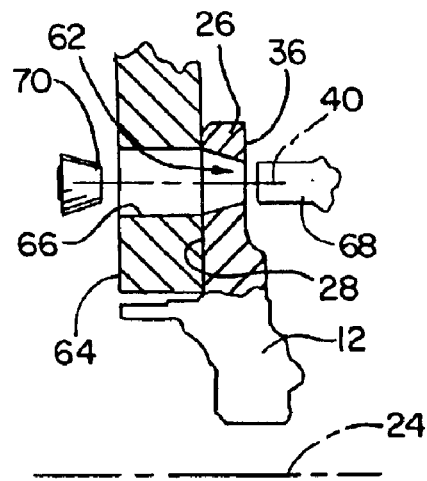
FIGS. 3–6 are schematic representations of steps in a method, according to our invention, for forming a spindle and a corner as shown in FIGS. 1 and 2.

The retaining screw hole 30 is formed by first piercing the annular flange 26 with a pilot hole 62 extending through the thickness 38 of the annular flange 26, as shown in FIG. 3. While the pilot hole 62 could be formed by drilling or punching a cylindrical walled hole in the flange 26 by conventional methods, we contemplate that it may be preferred to form a pilot hole 62 having a tapered sidewall by placing the rotor receiving surface 28 of the annular flange 26 against a base die plate 64 having a hole 66 of a die diameter passing through the die plate 64 and centered about the retaining screw hole axis 40, and punching the pilot hole 62 from the second surface 36 of the annular flange 26 with a punch 68 having an outer diameter smaller than the die diameter. Piercing the annular flange 26 in this manner knocks a tapered slug 70 out of the flange 26, and leaves a pilot hole 62 having walls that taper outward toward the rotor receiving surface 28 of the flange 26.

Figure 4:
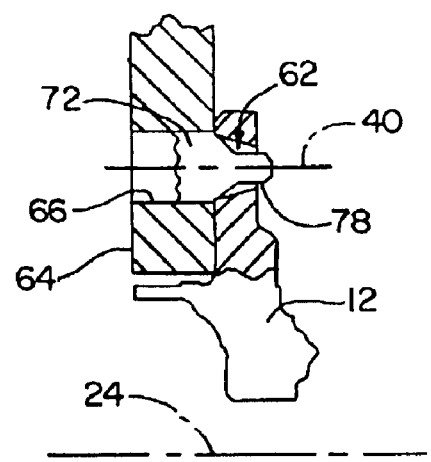
Figure 5:
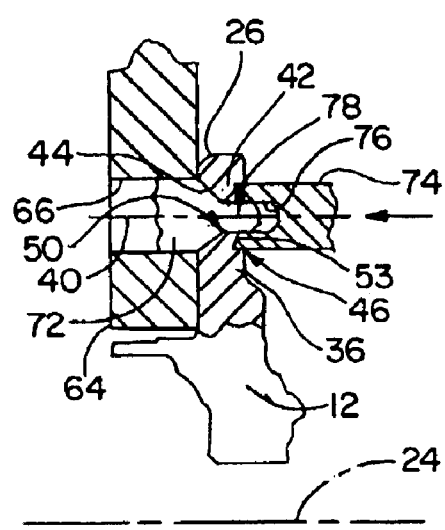

As shown in FIGS. 4 and 5, the conical web 42 is then formed by a base coining punch 72, inserted through the hole 66 in the base die 64 into the pilot hole 62, and a top coining punch 74 that replaces the pilot hole punch 68. The top coining punch 74 includes a guide hole 76 therein extending into the top coining punch 74 along the axis 40 of the rotor retaining screw hole 30. The guide hole 76 is adapted for receipt of a locator pin 78 extending from the base coining punch 72. The locator pin 78 extends from the base coining punch 72 along an axis of the base coining punch 72 coincident with the axis 40 of the rotor retaining screw hole 30, and is adapted for receipt within the guide hole 76 in the top coining die 78.

The first and second surfaces 44, 46, and the through hole 50 of the conical web 42 are formed in one operation by engaging the locator pin 78 of the base coining punch 72 in the guide hole 76 of the top coining punch 74, and pressing the base and top coining punches 72, 74 into the annular flange 26, to thereby cause material in the annular flange 26 to be deformed around the top and bottom coining punches 72, 74 and an exposed portion of the locator pin 78.

In the exemplary embodiment, the top coining punch 74 has an outer diameter significantly larger than the through hole 50, centered about the axis 24 of the retaining screw hole 30, and a distal end having a reverse conical configuration. The top coining punch 74 is pressed into the annular flange 26 to a depth below the second surface 36 of the flange, to form a counter bore 53 in the retaining screw hole 30 having a diameter substantially equal to the outer diameter of the top coining punch 74, while simultaneously forming the second surface 46 of the conical web 42 and forcing material from the flange 26 to flow around the locator pin 78 to form the through hole 50. The locator pin 78 may have a slight taper to facilitate material flow and disengagement of the locator pin from the guide hole 76 in the top coining die 74.

Figure 6:
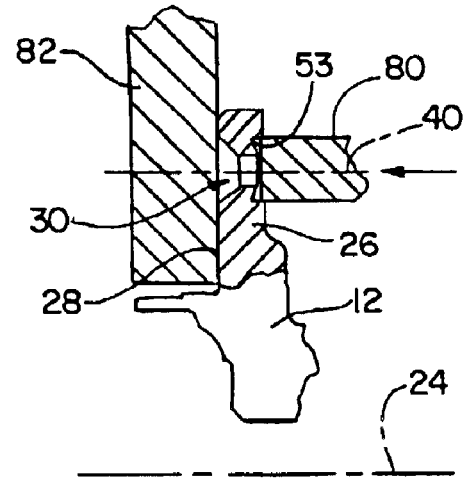

FIG. 6 illustrates the manner in which a spindle 12 having a retaining screw hole 30 formed as described above, can facilitate subsequent operations to form wheel bolt holes 56 in the annular flange 26, by providing a convenient method for indexing the location of the screw hole 30 about the spindle axis 24, with respect to a desired wheel bolt hole pattern. With the base and top coining punches 72, 74 removed, and the rotor retaining surface 28 of the annular flange 26 supported on a machining fixture 82, a wheel bolt locator pin 80 is inserted into the counter bore 53 in the rotor retaining screw hole 30, and one or more wheel bolt holes are formed in the annular flange 26 in a pattern located with respect to the wheel bolt locator pin 80. The wheel bolt holes may be formed by any known method, including operations such as drilling, boring, coining and swaging, or punching. One method that may be particularly advantageous is described in commonly assigned U.S. patent application Ser. No. 09/713,681, titled METHOD AND APPARATUS FOR WHEEL SPINDLES AND THE LIKE WITH IMPROVED LRO and now issued as U.S. Pat. No. 6,408,669.

While the embodiments of our invention disclosed herein are presently considered to be preferred, various changes and modifications can be made without departing from the spirit and scope of the invention. We wish to expressly state that the retaining screw hole 30, as described above, can be formed in many ways other than the method disclosed herein with regard to FIGS. 3–6, and that the web 42 may have shapes other than conical, such as one or more convolutions or ridges extending either along or transverse to the axis 40 of the rotor retaining screw hole 30. Individual elements and aspects of our invention may also be used independently from one another, or in different combinations than are described above and in the drawings with regard to the disclosed embodiments.

The scope of the invention is indicated in the appended claims. We intend that all changes or modifications within the meaning and range of equivalents are embraced by the claims.

We claim:

1. A method for manufacturing a wheel spindle to which a rotor may be attached, the method comprising:

fabricating a wheel spindle defining an axis of the spindle;

forming an annular flange extending perpendicularly to the axis and having a rotor receiving surface thereof adapted for receiving a brake rotor, and forming a rotor retention screw hole in the flange adapted for receiving a self-tapping screw for retaining the brake rotor against the rotor receiving surface of the annular flange;

the annular flange including a second surface thereof separated from the rotor receiving surface by a thickness of the flange;

the rotor retention screw hole extending through the thickness of the flange and defines a screw hole axis extending parallel to the axis of the spindle; and the rotor retention screw hole including a generally conical shaped web therein having a first surface thereof converging along the axis of the screw hole in a direction away from the rotor receiving surface, a second surface thereof separated from the first surface thereof by a thickness of the conical web, and a through hole therein extending along the screw hole axis from the first to the second surfaces of the conical web and adapted for engaging the self-tapping sheet metal screw.

2. The method of claim 1 further including forming the screw hole to include a counter bore therein extending from one of the surfaces of the annular flange for locating one or more wheel bolt holes in the flange.

3. The method of claim 2 including forming one or more wheel bolt holes in the annular flange, positioned with relation to the counter bore of the rotor retention screw hole.

4. The method of claim 1 further comprising forming the retaining screw hole by:

piercing the annular flange with a pilot hole extending through the thickness of the annular flange;

forming the first surface of the conical web by pressing a base coining punch into the pilot hole from the rotor receiving surface of the annular flange; and forming the second surface of the conical web by pressing a top coining punch into the pilot hole from the second surface of the annular flange.

5. The method of claim 4 wherein:

the top coining punch includes a guide hole therein extending into the top coining punch along an axis of the rotor retaining screw hole and adapted for receipt of a locator pin extending from the base coining punch;

the base coining punch includes a locator pin extending therefrom along an axis of the punch coincident with the axis of the rotor retaining screw hole and adapted for receipt within the guide hole in the top coining die; and the steps of forming the first and second surfaces of the conical web are formed by engaging the locator pin of the base coining punch in the guide hole of the top coining punch when pressing the base and top coining punches into the annular flange.

6. The method of claim 4 wherein the top coining punch has an outer diameter centered about the axis of the retaining screw hole and the method further comprises pressing the top coining punch into the annular flange to form a counter bore in the retaining screw hole having a diameter substantially equal to the outer diameter of the top coining punch.

7. The method of claim 6 further comprising:

inserting a wheel bolt locator pin into the counter bore in the rotor retaining screw hole; and forming one or more wheel bolt holes in the annular flange located with respect to the wheel bolt locator pin.

8. The method of claim 4 wherein piercing the annular flange to form the pilot hole comprises:

punching a pilot hole having a tapered sidewall by placing the rotor receiving surface of the annular flange against a base die plate having a hole of a die diameter therethrough centered about the retaining screw hole axis; and punching the pilot hole from the second surface of the annular flange with a punch having an outer diameter smaller than the die diameter.

* * * * *